July 28, 1959  A. J. ZEBRICK  2,896,698
BLOWPIPE NOZZLE AND METHOD OF MANUFACTURE
Filed Sept. 15, 1954

INVENTOR
ANDREW J. ZEBRICK
BY H. R. Johns
ATTORNEY

2,896,698

BLOWPIPE NOZZLE AND METHOD OF MANUFACTURE

Andrew J. Zebrick, Westfield, N.J., assignor to Union Carbide Corporation, a corporation of New York Application September 15, 1954, Serial No. 456,219

10 Claims. (Cl. 158—27.4)

This invention relates to a blowpipe nozzle and its process of manufacture. More particularly it relates to an improvement in those cutting or scarfing nozzles having a stainless steel supporting sleeve for an inner copper seat. Such an insert has long been used to prevent collapse of the thin copper seat when it would not otherwise have strength and rigidity to withstand a tendency to collapse on tightening the usual clamping nut for holding the nozzle tapered seats against similarly tapered cooperative seat portions in a blowpipe head or body portion.

An object of this invention is to provide a blowpipe nozzle having such a stainless steel reinforcing and supporting sleeve that will not fall out of place and will be held in position in a simple and effective manner without recourse to the use of silver solder. Another object is to provide an improved process for inserting and retaining such a sleeve in position in the blowpipe nozzle.

Figure 1:
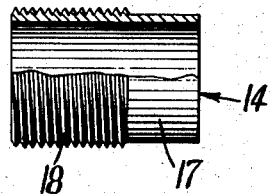
Figures 2, 3:
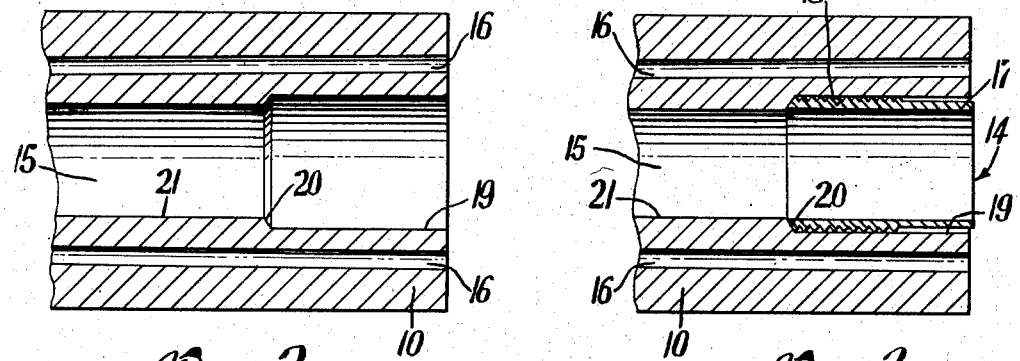
Figures 4, 5:
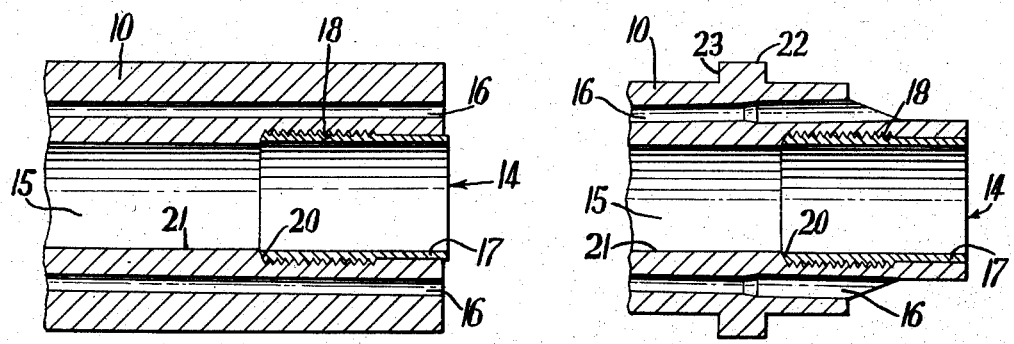
Figure 6:
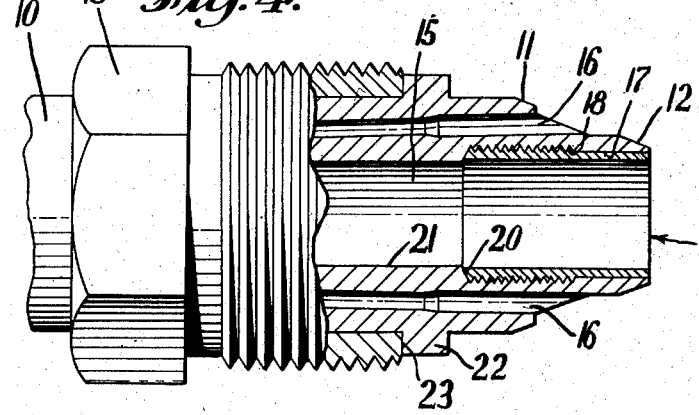

Referring to the drawing, Fig. 1 shows a preferred embodiment of the stainless steel sleeve before having been inserted in the nozzle. Fig. 2 shows the nozzle in condition for reception of the sleeve of Fig. 1. Fig. 3 shows the sleeve in the nozzle before the nozzle material has been worked to retain the sleeve in position. Fig. 4 shows the nozzle and sleeve after the nozzle has been swaged to retain the sleeve in position. Fig. 5 shows the nozzle end after the ends of the preheat passages have been shaped and after a peripheral rib has been formed upon the end. Fig. 6 shows the nozzle end of Fig. 5 after the seats have been formed and a clamping nut placed in position.

As shown in Fig. 6 the scarfing or cutting nozzle 10 for a blowpipe is usually of copper which has been chromium plated on completion. Outer and inner tapered seat portions 11 and 12 are formed for cooperation with complementary tapered seat portions in a blowpipe head or body portion, the nozzle usually having its seat portions clamped for gas-tight cooperation with the head or body portion by means of a usual clamping nut 13. A stainless steel reinforcing sleeve 14 has its axial bore substantially flush with the axial oxygen passageway 15 in the nozzle. The customary preheat passageways 16 of smaller diameter are arranged as is usual substantially symmetrically around the central passageway 15. The wall between the central passageway 15 and the preheat passageway 16 is not made thicker because extra weight at the end of the blowpipe would increase fatigue on the part of the workman who has to handle this blowpipe nozzle frequently in a tiring position. When the radial wall between the preheat and central oxygen passageways is made thin it has been found there is a tendency for the clamping nut 13 to press the seat 12 against its cooperative seat portion so tightly as to tend to collapse the seat 12, resulting in objectionable gas leakage. To overcome this danger it has been customary to use a stainless steel reinforcing and strengthening sleeve within the inner end seat. The difficulty, however, with such a sleeve has been the likelihood of its coming out of its intended position. One expedient has been to use silver solder for holding it in place, but this is tedious, expensive and not always reliable.

Under this invention such a stainless steel sleeve is now rigidly sealed in place in a simple and effective manner without recourse to such silver solder. The process by which the sleeve is held in place may be more vividly understood by reference to Figs. 1 to 6 of the drawing. The stainless steel sleeve 14 shown in Fig. 1 is provided with an end portion 17 having an outside diameter which is smaller than that of its other end portion 18. In the embodiment illustrated the portion 18 of larger outside diameter is shown as being provided with screw threads or grooves of any convenient size and shape. The end of the nozzle into which the sleeve 14 is to be placed is provided with a portion 19 having a diameter large enough to freely receive the threaded sleeve. At the end of the enlarged portion 19 is a shoulder 20 against which the sleeve will abut, the shoulder 20 being at a distance from the end of the nozzle shown such that the entire sleeve may be received therein as illustrated. The main bore 21 of the oxygen passageway 15 is of substantially the same inside diameter as that of the sleeve. The sleeve is then slid into position as is shown in Fig. 3.

The next operation is to swage, compress, or flow the copper of the nozzle radially inwardly into contact with the outer surface of the sleeve, both between the threads and along the portion 17 of reduced outside diameter. This is accomplished in ways understood by those skilled in the art which entail hammering or otherwise effecting the metal flow radially inward with mandrels or wires extending through passageways 15 and 16 to prevent their being unduly deformed. After completion of the nozzle blank as shown in Fig. 4, the right end of the workpiece is placed in a chuck and the outer surface is reduced in diameter as shown to the left of the rib 22 and the side 23 is formed as an abutment for the clamping nut 13. Next the nozzle is centered in a chuck using the portion of reduced diameter to the left of rib 22 and the portion of reduced diameter to the right of rib 22 is cut. Finally the bevel or tapered seats 11 and 12 are cut in ways known to the art at an angle of about 40°. The clamping nut 13 is to engage and press the nozzle against gas-tight seats in the blowpipe head or body portion. The clamping nut 13 may be placed in position before the rib 22 is formed in event the opposite end of the nozzle may be bent or shaped to make it difficult for the nut to be slipped onto the nozzle from that opposite end. In forming these gas-tight seats 11 and 12 care should be taken that the tapered or bevelled portion of the inner seat 12 does not extend into the sleeve 14 which is of harder material. The reason for this is that were the seat 12 to extend into the stainless sleeve it would be difficult if not impossible to make it gas-tight because the harder sleeve 14 would present a different degree of yieldability for a cutting or grinding tool forming the tapered seats.

Among the advantages of this invention may be mentioned the provision of an improved nozzle for cutting or scarfing having minimum size and weight for maximum serviceability and for transmission of a required maximum amount of oxygen. Unlike previous nozzles in which the inner seat has been reinforced, the strengthening sleeve in this invention is firmly held in place by the material of the nozzle which fits against the end portion of the sleeve of reduced outside diameter and also which extends into the grooves between the threads. Thus this portion of the nozzle material which has been brought into contact with the end portion of the sleeve and into contact with the grooves between the threads, serves as an abutment or stop to block withdrawal of the sleeve from the nozzle. The swaging operation for retaining the sleeve in place is less tedious, less expensive, and more reliable than the prior attempts to silver solder the sleeve in place. The prior silver soldering entailed the danger of softening or annealing the copper at the inner or lower seat 12. This invention does not have such disadvantage.

I claim:

1. A blowpipe nozzle having an axial bore, smaller diameter passageways extending longitudinally of the nozzle and radially outside said axial bore, a tapered seat at the head end portion of said nozzle outside the axial bore and between it and said passageways, a larger tapered seat farther from the head end of said nozzle and radially outside said passageways, the head end portion of said axial bore underlying said larger seat being of greater diameter than the remainder thereof, the increase in diameter being less than the wall thickness between said axial bore and said passageways radially outside thereof, and a stainless steel sleeve of a wall thickness less than that of said nozzle between said axial bore and said passageways radially outside thereof inserted in said greater diameter axial bore portion and supporting, said stainless steel sleeve having a cylindrical inner surface of the same diameter as the remainder of said axial bore therebeyond said first mentioned seat against collapse when it is pressed against a correspondingly tapered complementary seat portion by a clamping nut, the inserted end portion of said sleeve having a larger outside diameter than the remainder thereof and underlying said larger tapered seat, and the nozzle material underlying said first seat being contiguous to the smaller outside diameter portion of said sleeve to prevent said larger outside diameter portion of said sleeve from coming out of the greater diameter head end portion of said axial bore.

2. A process for securing a supporting sleeve inside the head end of an axial bore of a blowpipe nozzle to present collapse of a tapered seat at the head end portion of said nozzle having preheat passageways therein, said process comprising forming said sleeve with a portion of larger outside diameter and the remainder of smaller outside diameter, forming an enlargement of said nozzle bore for a distance back from the head end portion equal to substantially the length of said sleeve and of a size to allow insertion of the sleeve therein, but to leave a nozzle wall thickness inside the confines of said preheat passageways inserting said sleeve within said bore enlargement with the larger portion of the sleeve within a rear part of said bore enlargement beyond the location for said seat, inserting mandrel wires extending through said preheat passageways outside said nozzle wall thickness, and swaging the nozzle material around said mandrel wires and simultaneously swaging the nozzle material onto at least the smaller diameter part of said sleeve to leave sufficient material outside of said enlargement for the formation of said seat and simultaneously form on the inside thereof an abutment to prevent withdrawal of said sleeve through the head end portion of the nozzle.

3. A blowpipe nozzle having therein a central bore for oxidizing gas and a series of smaller bores for fluid fuel annularly spaced there around, the head end of said nozzle having a smaller conical seat portion around said central bore and a larger conical seat portion farther from the head end and outside of said smaller bores, the head end portion of said central bore underlying said larger seat being enlarged, a collapse resistant sleeve in said enlarged head end central bore portion and constructed of stronger and harder material than said seats and having a cylindrical inner surface of the same diameter as and flush with the remaining portion of said central bore therebeyond, the inserted end portion of said sleeve being of greater diameter than the remaining portion thereof, said greater diameters of said sleeve and of said enlarged central bore being less than the inner diameter of the annulus determined by said smaller bores, the outer surface of said greater diameter insert sleeve portion being serrated, the material of said nozzle forming said larger conical seat and containing said smaller bores being swaged into contact with the serrations, and the material of said nozzle forming said smaller conical seat being swaged into contact with the smaller diameter remaining portion of said insert sleeve.

4. A blowpipe nozzle having therein a central bore around which are smaller bores, the head end of said nozzle having a smaller conical seat around said central bore and a larger conical seat farther from the head end and outside of said smaller bores, the head end portion of said central bore underlying said larger seat being of greater diameter than the remainder of said central bore, a collapse resistant sleeve within said greater diameter portion of said central bore of stronger and harder material than said nozzle, said collapse resistant sleeve having a cylindrical inner surface of the same diameters as the remainder of said axial bore therebeyond, peripherally extending serrations on the outer surface of said sleeve underlying said larger seat and of greater diameter than the remainder of said sleeve, said greater diameters of said central bore and said serrations being less than the larger diameter of said smaller conical seat, the material of the nozzle forming said larger conical seat and containing said smaller bores being swaged into contact with said peripherally extending serrations, and the material of said nozzle forming said smaller seat being swaged into contact with the smaller diameter remaining portion of said insert sleeve.

5. Method of manufacturing a blowpipe nozzle from a blank having a central bore and a series of smaller bores annularly spaced therearound, which comprises forming an enlargement of the head end portion of said central bore, inserting in said enlargement a supporting sleeve having an outside diameter at the inserted end greater than the remainder thereof but smaller than the inner diameter of the annulus determined by said smaller bores, inserting mandrel wires in said smaller bores, and swaging the blank to leave sufficient nozzle material outside of said series of wires and the larger end of said sleeve for the formation of a tapered seat and simultaneously compressing the material inside of said series of wires onto the smaller diameter part of said sleeve to form an abutment to prevent withdrawal thereof.

6. Method of manufacturing a blowpipe nozzle from a blank having a central bore and a series of small bores annularly spaced therearound, which comprises forming an enlargement of the head end portion of said central bore, inserting in said enlargement a collapse resisting sleeve having peripherally extending serrations at the inserted end with an outside diameter greater than the remainder thereof, said greater diameters of said enlargement and of said serrations being less than the inner diameter of the annulus determined by said smaller bores, inserting an annular series of mandrel wires in said smaller bores, and swaging the blank to compress the material inside said annular series into grooves between the peripherally extending serrations while leaving outside the annular series sufficient material to form a large tapered seat, and to simultaneously compress the material inside the annular series into contact with the smaller diameter part of said sleeve to form an abutment to prevent withdrawal thereof while leaving inside said annular series sufficient material to form a smaller tapered seat adjacent the head end of the nozzle.

7. A blowpipe nozzle for scarfing or cutting having therein a central bore around which are smaller bores, a tapered seat portion at the head end portion of said nozzle extending around the central bore and also between the central and smaller bores, a larger tapered seat portion farther away from the head end of said nozzle and outside of said smaller bores, the head end portion of said bore underlying said larger seat being of greater diameter than the remainder thereof, a sleeve within said greater diameter portion of said central bore of stronger and harder material than that of which the nozzle is formed and having a cylindrical inner surface of the same diameter as and substantially flush with that of said nozzle bore beyond said sleeve, the outer surface of said sleeve underlying said larger tapered seat being of greater diameter than the remainder thereof underlying said smaller seat, the material of said nozzle underlying said smaller tapered seat, said greater diameters of said sleeve and of said axial bore being less than the distance between opposite pairs of said smaller bores being contiguous to at least the smaller diameter portion of said sleeve to retain the greater diameter portion of said sleeve against coming out of said greater diameter portion of the head end of said central bore underlying said larger tapered seat.

8. Method of manufacturing a blowpipe nozzle from a blank having a central bore and a series of smaller bores annularly spaced therearound, which comprises forming an enlargement of the head end portion of said central bore of a size to leave a wall thickness inside said series of smaller bores, inserting in said enlargement a supporting sleeve having an outside diameter at the inserted end greater than the remainder thereof, inserting mandrel wires in said smaller bores, and swaging the blank around said mandrel wires to leave sufficient nozzle material outside of said series of wires and the larger end of said sleeve for the formation of a tapered seat and simultaneously compressing the material inside of said series of wires onto the smaller diameter part of said sleeve to form an abutment to prevent withdrawal thereof, and after compressing the nozzle material, forming said tapered seats on said end of the nozzle into which the sleeve has been inserted but without said tapered seats being constituted in any portion thereof by said sleeve.

9. Method of manufacturing a blowpipe nozzle from a blank having a central bore and a series of smaller bores annularly spaced therearound, which comprises forming an enlargement of the head end portion of said central bore of a size to leave a wall thickness inside said series of smaller bores, inserting in said enlargement a supporting sleeve having an outside diameter at the inserted end greater than the remainder thereof, inserting mandrel wires in said smaller bores, and swaging the blank to leave sufficient nozzle material outside of said series of wires and the larger end of said sleeve for the formation of a tapered seat and simultaneously compressing the material inside of said series of wires onto the smaller diameter part of said sleeve to form an abutment to prevent withdrawal thereof, and forming a peripheral rib around said nozzle after withdrawal of said sleeve has been blocked, adjacent the larger end of said sleeve, and before any tapered seat portions have been formed around said sleeve, and then forming said tapered seats.

10. A blowpipe nozzle having an axial bore for oxidizing gas and a series of smaller diameter passageways for fluid fuel extending longitudinally of the nozzle and radially outside of said axial bore, a tapered seat at the head end portion of said nozzle outside the axial bore and between it and said passageways, a larger tapered seat farther from the head end of said nozzle and radially outside said passageways, the head end portion of said axial bore underlying said larger seat being of greater diameter than the remainder thereof, and a stainless steel reinforcing sleeve of a maximum wall thickness less than the smaller diameter of said fluid fuel passageways inserted in said greater diameter axial bore portion and having a cylindrical inner surface of the same diameter as and flush with the remaining portion of said axial bore for supporting said first mentioned seat against collapse when it is pressed against a correspondingly tapered complementary seat portion by a clamping nut, the inserted end portion of said sleeve having a larger outside diameter and greater wall thickness than the remainder thereof and having peripheral serrations on its outer surface, the nozzle material underlying said larger tapered seat being swaged into said serrations, and the nozzle material underlying said first seat being swaged into contact with the smaller outside diameter and wall thickness portion of said sleeve to prevent said larger diameter portion of said sleeve from coming out of the greater diameter head end portion of said axial bore.

References Cited in the file of this patent

UNITED STATES PATENTS

| | | |
|---|---|---|
| 1,302,690 | Maxwell | May 6, 1919 |
| 2,217,193 | Aronson | Oct. 8, 1940 |
| 2,353,318 | Scheller | July 11, 1944 |
| 2,383,949 | Aronson | Sept. 4, 1945 |
| 2,444,487 | Aronson | July 6, 1948 |
| 2,499,524 | Pach | Mar. 7, 1950 |
| 2,694,851 | Marra | Nov. 23, 1954 |